Sept. 5, 1961 H. E. RUEHLEMANN 2,999,208

R-C LONG DELAY TIMING CIRCUIT

Filed March 7, 1955

*INVENTOR*
H. E. RUEHLEMANN

BY

G. W. O'Brien
W. O. Quesenberry
ATTORNEYS

United States Patent Office 2,999,208

Patented Sept. 5, 1961

2,999,208

R-C LONG DELAY TIMING CIRCUIT

Herbert E. Ruehlemann, Fullerton, Pa., assignor to the United States of America as represented by the Secretary of the Navy Filed Mar. 7, 1955, Ser. No. 492,812
7 Claims. (Cl. 328—78)
(Granted under Title 35, U.S. Code (1952), sec. 266)

The invention described herein may be manufactured and used by or for the Government of the United States of America for governmental purposes without the payment of any royalties thereon or therefor.

The present invention relates to an electrical time delay circuit having a long delay time and more particularly to an electrical long time delay circuit wherein the time delay period is determined by the time required for the charge on a capacitor to build up to a given potential in a plurality of discrete potential build-up steps.

In fuze detonation systems, it is frequently desirable to provide apparatus or electrical circuits which will introduce a time of several days between the arming of a fuze and the detonation of the fuze. Heretofore, this has been accomplished in various ways, such as by clockwork mechanisms or chemically operated devices. All mechanical delay systems are seriously limited by cost of manufacture and lack of simple uniform adjustment. Chemically operated devices are susceptible to chemical deterioration and are also affected by changing atmospheric and temperature conditions.

In the past, electrical resistor-capacitor delay circuits have been proposed to provide long time delays, but they proved to be insufficient for delay times exceeding twenty hours due to leakage resistance of the circuitry and due to dark current of the cold cathode diode. A further disadvantage in these prior R-C delay systems is that they cannot be made in small sizes on a mass production basis. Furthermore, the dark current of any available cold cathode diode removes more charge from the ignition capacitor than can accumulate in the ignition capacitor through the charging resistor, especially when the voltage in the ignition capacitor approaches the breakdown potential of the diode. In order to compensate for charge loss due to dark current, a high valued capacitor is necessary, which in turn requires a very large resistor, of the order of several hundred thousand megohms. Resistors of such size are expensive, unstable and vary appreciably with temperature changes.

The present invention contemplates the provision of an electrical resistor-capacitor time delay circuit which avoids the above disadvantages of prior resistor-capacitor time delay arrangements. More specifically, the present invention provides an R-C time delay network which has relatively low value resistor requirements.

In accordance with the invention, an ignition capacitor is connected across a charging capacitor through a cold cathode gas diode which acts as a switch to discharge the charging capacitor through the ignition capacitor when the potential on the charging capacitor exceeds the breakdown potential of the diode. Each of the capacitors has a resistor associated therewith which is of such value that the discharging time constant of the ignition capacitor through its associated resistor is equal to or greater than the charging time constant of the charging capacitor. As a consequence, the ignition capacitor is not fully discharged when the charging capacitor again applies a charging potential to the ignition capacitor. A cold cathode firing gas diode is connected to have the charge on the ignition capacitor applied thereto. In this manner, the ignition potential for the firing diode builds-up across the ignition capacitor in a plurality of steps, each step increasing the potential of the ignition capacitor, until it exceeds the breakdown voltage of the firing diode at which time the firing diode conducts. The time for the total number of steps equals the desired delay time, but the time for each step consequently is only a fraction of the total time. An important feature of the invention is that at each step a charge is supplied to the ignition capacitor which is partially lost before the next step occurs.

An important object of the present invention is the provision of an electrical long time delay circuit which has low resistor and capacitor requirements.

Another object of the invention is to provide an electrical time delay circuit wherein the time delay period is determined by the time required for a firing capacitor to build up to a predetermined potential in a series of discrete potential build-up steps.

A further object of the invention is to provide, in an electrical time delay network employing a firing gas diode, a new and improved time constant network arrangement wherein the influence of the diode dark current is rendered negligible.

A primary object of the invention is the provision, in an electrical time delay circuit, of a resistor-capacitor arrangement having successively increasing steps of charging potential applied thereto, the charge supplied at each step being partially lost before the next step occurs.

Other objects and many of the attendant advantages of this invention will be readily appreciated as the same becomes better understood by reference to the following detailed description when considered in connection with the accompanying drawings in which like reference numerals designate like parts throughout the several figures thereof and wherein.

Figure 1:
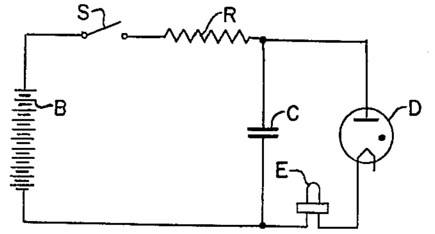
FIG. 1 is a schematic diagram of a standard, well-known electrical time delay circuit.

In order to describe certain of the advantages of the invention, reference is made to a prior art arrangement represented in FIG. 1 which illustrates a standard R-C time delay circuit for a time-delayed fuze. A voltage source B is connected through an arming switch S to a series R-C network consisting of resistor R and capacitor C. A firing circuit containing a gas diode D and a fuze detonator E is connected across the capacitor C.

Figure 3:
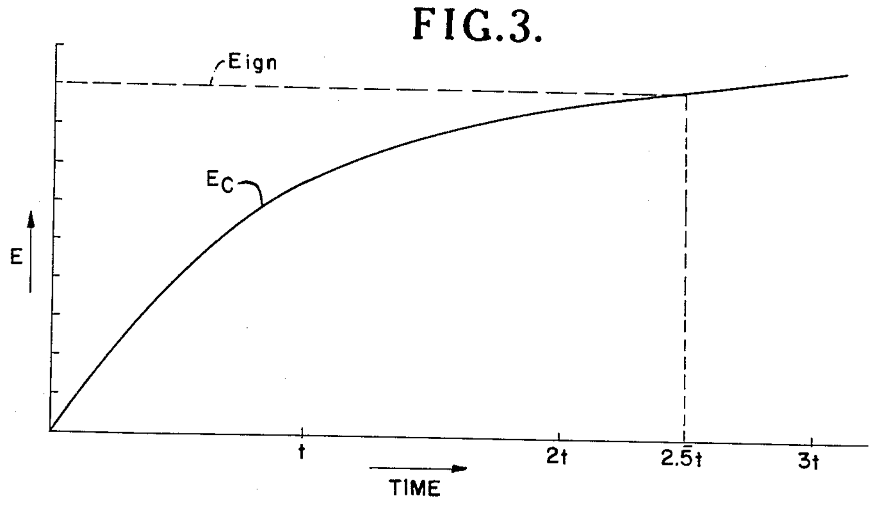
FIG. 3 is a graph illustrating the charging characteristic of the circuit of FIG. 1.

In the simple R-C circuit of FIG. 1, the charge on capacitor C builds up in time relation as illustrated by the curve $E_C$ of FIG. 3 until the charging potential on the capacitor reaches the breakdown potential of diode D. In standard practice, the values of source B, resistor R and capacitor C have been selected so that the charge on capacitor C reaches the breakdown potential of diode D between 2 and 3 times constants ($t$). For example, assuming that $t=40$ hours, then a time delay of 100 hours would require that the capacitor C should attain the breakdown potential of diode D in $2.5t$.

Referring to FIG. 3, after $2.5t$ the voltage in capacitor C equals practically 90% of the applied voltage, which in most fuze applications should not exceed 300 volts. After $2t$, the voltage in capacitor C is 85%, and after $3t$ the voltage in the capacitor C is 95% of the voltage, corresponding to a voltage increase of approximately 30 volts during $1t$, or 40 hours. The voltage increase at the ignition point therefore is in the range of 0.2 millivolt per second.

With a capacitor C of 0.2 mfd. a current of $4\times10^{-11}$ amperes is necessary to guarantee such a voltage increase. But the dark current of the best diode available is between $2\times10^{-10}$ and $5\times10^{-10}$ amperes. Therefore, to compensate for the charge loss due to dark current, the capacity or the applied voltage or both must be increased by a factor of approximately 10.

The circuit of FIG. 1 requires a charging resistor of a value at least in the range of $7.5\times10^{+11}$ ohms. Therefore, the insulation of the capacitors and the whole circuit should be approximately $10^{+13}$ ohms. Although this appears feasible under present production techniques, such resistors in the range of $10^{+12}$ ohms are expensive, unstable and change in resistance value with temperature. Another alternative to compensate for charge loss due to dark current is to change the ignition point from $2.5t$ to a lower value, but in this case the resistance must be increased above $10^{+12}$ ohms, which is even more undesirable.

Figure 2:
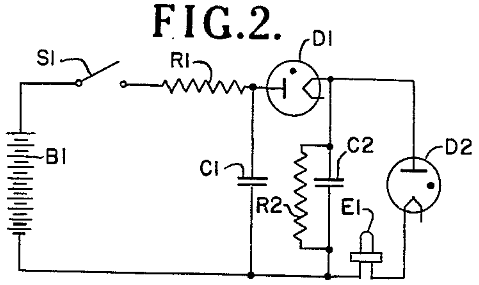
FIG. 2 is a schematic diagram of an electrical time delay circuit in accordance with the invention.

The present invention provides an R-C time delay circuit which does not require high resistances and in which there is negligible charge loss due to diode dark current. A circuit in accordance with the invention is shown in FIG. 2, wherein a storage or charging capacitor C1 is charged from a voltage source B1 through an arming switch S1 and charging resistor R1 until capacitor C1 has been charged to a potential equal to the breakdown potential of a cold cathode gas diode D1 whereupon capacitor C1 discharges through diode D1 to charge an ignition or firing capacitor C2. When capacitor C1 has sufficiently discharged so that the potential difference between the high sides of capacitors C1 and C2 are equal to the extinguishing potential of diode D1, the diode D1 acts as a switch and ceases to conduct, at which instant capacitor C1 again begins to charge and capacitor C2 to discharge through resistor R2.

Figure 4:
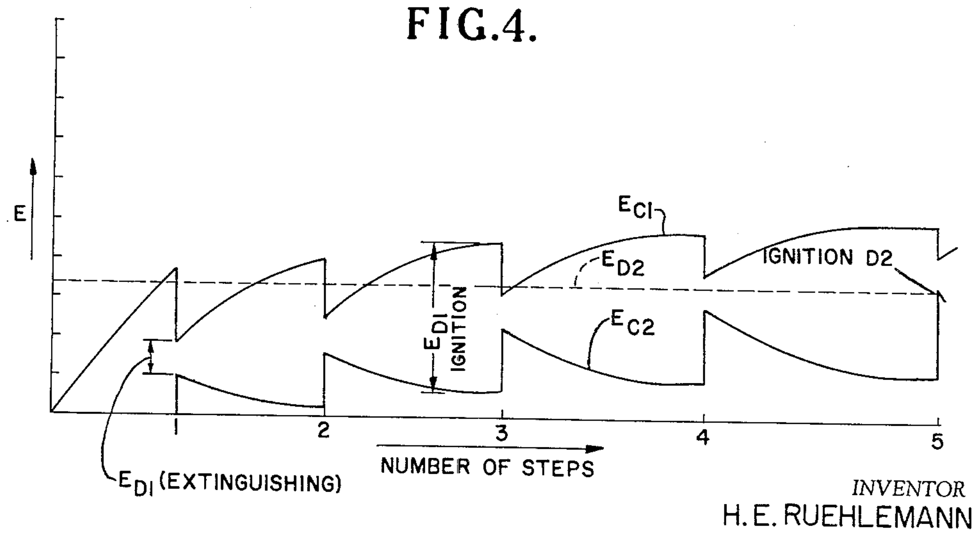
FIG. 4 illustrates the charge and discharge characteristics of the capacitors in the circuit of FIG. 2.

More specifically and referring to FIG. 4, wherein curves $E_{C1}$ and $E_{C2}$ are the charging characteristics of capacitors C1 and C2, respectively, capacitor C1 is gradually charged until at step 1 it reaches the breakdown potential of diode D1 and begins to discharge therethrough to charge capacitor C2 until the potential differences of the two capacities C1 and C2 are equal to the extinguishing potential $E_{D1\text{-}ext}$ at which time diode D1 ceases conducting. The ratio of the two capacities C1 and C2 and the value of the extinguishing potential of the diode D1 determine the voltage in condenser C2 at the instant of extinguishment. This voltage in C2 after the first step is selected to be lower than the breakdown voltage of a cold cathode gas diode D2 which is included in a firing circuit consisting of diode D2 and a fuze detonator E1. Therefore, no ignition of diode D2 occurs at the first step.

Parallel to capacitor C2 is a discharge resistor R2, which drains down the voltage in capacitor C2 after it has received a charge, as illustrated in FIG. 4 by the drop in potential of curve $E_{C2}$ between steps 1 and 2 for example. The time constant of resistor R2 and capacitor C2 is selected to be equal to or greater than the charging time constant of resistor R1 and capacitor C1. Therefore, capacitor C2 is not fully discharged before the potential difference between the high sides of capacitors C1 and C2 is again equal to the breakdown potential of diode D1. At this instant, a second step occurs and capacitor C2 is again recharged from capacitor C1 through diode D1 until the potential difference between capacitors C1 and C2 has again been reduced to the extinguishing potential of diode D1. Because a small voltage charge remained in capacitor C2 from the first step, the peak voltage in capacitor C2 at the second step is higher by this amount, and also the voltage across capacitor C1 at the second step is higher by the same amount.

In this way, at corresponding instants of each step, the voltage across capacitor C1 is higher than at the step before, increasing to an equilibrium voltage. In the same way, the peak-voltage across capacitor C2 increases with each step; and, when this peak-voltage after a certain number of steps exceeds the breakdown voltage of the diode D2, the diode D2 fires, igniting the detonator E1.

From the foregoing, it is apparent that the total delay time is reached after a number of charging steps and that the voltage increase across C1 at each step is considerably higher than in a straight R-C circuit, thereby compensating for the loss of charge due to dark current of diode D1. It is also apparent that only at the peak does the voltage across capacitor C2 approach the breakdown voltage of diode D2, since most of the time the voltage at capacitor C2 is far below the breakdown voltage of diode D2, thereby rendering the dark current of diode D2 negligible. Furthermore, any dark current influence from diode D2 can be automatically compensated by resistor R2 which, as heretofore stated, is employed to discharge the condenser C2.

Although the time delay circuit of the invention is illustrated as being used in conjunction with a fuze detonator, it is to be understood that the invention is not limited to that use only but has application in other systems wherein a utilization device is desired to be rendered operable a predetermined interval of time after an energizing switch is closed or after the occurrence of a predetermined signal or step in a series of signals or steps.

Obviously many modifications and variations of the present invention are possible in the light of the above teachings. It is therefore to be understood, that within the scope of the teachings herein disclosed and the appended claims, the invention may be practiced otherwise than as specifically described.

What is claimed as new and desired to be secured by Letters Patent of the United States is:

1. An electrical time delay circuit comprising a triggering circuit including a normally disabled gas diode, a first time constant network including a parallel connected resistor of predetermined value and capacitor connected across said triggering circuit, a second time constant network including a resistor and a capacitor, means including a source of potential for charging said second network, and automatic switch means interconnecting said first and second networks and being intermittently operable when the potential difference between said networks is of a first predetermined value and of a second predetermined value to provide a low impedance conductive path and a high impedance virtually nonconductive path, respectively, between said networks whereby said first network is charged in successive steps to a potential level by said second network sufficient to fire said diode after a predetermined number of intermittent operations of said automatic switch means.

2. The circuit of claim 1 wherein said automatic switch means is a gas diode, the breakdown potential and the extinguishing potential thereof corresponding in values to said first and second predetermined values, respectively.

3. An electrical time delay circuit comprising a triggering circuit including a normally conductive gas diode adaptable upon conduction thereof to render effective a normally ineffective utilization device, a first time constant network including a parallel connected resistor of predetermined value and capacitor connected across said triggering circuit, a second time constant network including a resistor and a capacitor, means including a source of voltage for charging said second network, and automatic switch means interconnecting said first and second networks and intermittently operable, at intervals when the potential difference between said networks is of a predetermined value, to provide a conductive discharge path therethrough for said second network whereby the capacitor of said second network charges the capacitor of said first network, said switch means being also intermittently operable, at intervals when said second and first networks have respectively discharged and charged sufficiently that the potential difference between said networks has reduced to a second predetermined value, to provide a virtually open circuit between said networks whereby said second network may be recharged from said source and the capacitor of said first network may discharge through its respective resistor, the time constant of said first network being at least equal to or greater than the time constant of said second network whereby the charge applied to the capacitor of said first network from said second network at each of the conductive intervals of said switch means is only partially lost when said second network applies the immediately succeeding charge ot the capacitor of said first network to thereby ultimately result in a cumulative charge on the capacitor of said first network sufficient to render said diode conductive.

4. An electrical timing system of the character disclosed comprising, in combination, an actuating circuit including a normally nonconductive gas discharge device adaptable upon conduction thereof to render effective a normally ineffective utilization apparatus, said device having an inherent dark current influencing characteristic, a charging capacitor for said device connected across said actuating circuit, dark current compensating means for said device and including means of predetermined value paralleling with said capacitor to provide a discharge path for said capacitor, a second capacitor, means for charging said second capacitor at a rate exceeding the rate of discharge of said first named capacitor through said compensating means, and means including a gas diode interconnecting said capacitors for causing said first named capacitor to receive a charge from said second capacitor at successive intervals when the potential difference between the capacitors is sufficient to trigger the diode thereby to ultimately result in a cumulative charge on said device sufficient to render said discharge device conductive.

5. An electric timing circuit including first and second capacitors, means for charging said first capacitor and including a resistor forming an R-C network therewith of predetermined time constant, a second resistor of predetermined value paralleling said second capacitor to form therewith an R-C network of a time constant greater than the time constant of said first named R-C network, means including a gas diode inter-connecting said capacitors for causing said second capacitor to receive a charge from said first capacitor at intervals when the potential difference between the capacitors is sufficient to trigger the diode, and utilization circuit including a second gas diode connected across said second capacitor and rendered effective when the voltage across the second capacitor has increased to a value sufficient to trigger said second diode.

6. An electrical time delay circuit comprising, a closed series circuit including a source of energizing potential, a resistor and a capacitor, the parameters of said resistor and capacitor being such that said capacitor is charged from said source at a predetermined rate, a parallel circuit consisting of a second resistor of predetermined value and a second capacitor, circuit connections including a gas diode for connecting said parallel circuit across said first named capacitor whereby said second capacitor receives a charge from said first named capacitor at intervals when the potential difference between the capacitors is sufficient to trigger the diode, the parametric values of the components in said parallel circuit being selected so that said second capacitor discharges through said second resistor at a rate less than said predetermined rate whereby the potential on the second capacitor at the instant a charge is applied thereto is slightly greater than the potential thereof at the instant an immediately preceding charge was applied thereto thereby resulting in a nonlinear cumulative potential build up on said second capacitor, and a normally ineffective actuating circuit connected across said capacitor, said actuating circuit including a normally disabled gas diode which is enabled to render said actuating circuit effective when the cumulative potential build up on said second capacitor exceeds the breakdown potential of said normally disabled diode.

7. An electrical timing system of the character disclosed comprising a capacitor, means for charging said capacitor at a predetermined rate, a second capacitor, means including a gas diode interconnecting said capacitors for causing said second capacitor to receive a charge from the first named capacitor at intervals when the potential difference between the capacitors is sufficient to trigger the diode, means of predetermined value paralleling said second capacitor for causing a discharge current to flow from said second capacitor at a rate such that the voltage of the second capacitor at the instant a charge is applied thereto is slightly greater than the voltage thereof as an immediately preceding charge was applied thereto, and a firing circuit including a second gas diode connected across said second capacitor and rendered effective when the voltage across said second capacitor has increased to a value sufficient to trigger the second diode.

References Cited in the file of this patent

UNITED STATES PATENTS

| | | |
|---|---|---|
| 2,467,476 | Hallmark | Apr. 19, 1949 |
| 2,495,726 | Houghton et al. | Jan. 31, 1950 |